United States Patent [19]

Fejes et al.

[11] Patent Number: 4,661,220
[45] Date of Patent: Apr. 28, 1987

[54] METHOD FOR LOCAL CLEANING OF SURFACES ON A NUCLEAR REACTOR WHICH ARE COATED WITH OXIDES OR OTHER CORROSION PRODUCTS, IN CONNECTION WITH INSPECTION

[75] Inventors: Peter Fejes; Antti Suvanto, both of Västerås, Sweden

[73] Assignee: AB Asea-Atom, Västerås, Sweden

[21] Appl. No.: 746,339

[22] Filed: Jun. 19, 1985

[30] Foreign Application Priority Data

Jul. 4, 1984 [SE] Sweden .............................. 8403542-7

[51] Int. Cl.$^4$ .............................................. C25F 1/00
[52] U.S. Cl. ..................................... 204/141.5; 134/1; 376/310
[58] Field of Search .............. 376/463, 308, 310, 260, 376/249; 204/145.1, 141.5; 134/1, 2

[56] References Cited

U.S. PATENT DOCUMENTS 1,369,271  2/1921  Edison .............................. 204/141.5

FOREIGN PATENT DOCUMENTS 2534410  4/1984  France .................................... 134/1
753931  8/1980  U.S.S.R. ........................... 204/141.5

Primary Examiner—Deborah L. Kyle
Assistant Examiner—John S. Maples
Attorney, Agent, or Firm—Watson, Cole, Grindle & Watson

[57] ABSTRACT

During local cleaning of metallic surfaces (15, 24) on parts included in the primary circuit of a nuclear reactor, which surfaces are coated with corrosion products, in connection with inspection of the surfaces, the coated surface, while being located below the surface of the reactor water (13) in the reactor vessel (10) or reactor pool (12) of the nuclear reactor, is arranged in contact with an electrolytically permeable spacer (16) of an electrically insulating material which, at a distance from the coated surface, is arranged in contact with a body (170 of electrically conductive material. An electrolyte (21) is supplied to the spacer and an electrical potential difference is maintained between the coated metallic surface and the body of conductive material by connecting the surface to the positive pole (18) and the body to the negative pole (19) of a voltage source (20).

10 Claims, 2 Drawing Figures

METHOD FOR LOCAL CLEANING OF SURFACES ON A NUCLEAR REACTOR WHICH ARE COATED WITH OXIDES OR OTHER CORROSION PRODUCTS, IN CONNECTION WITH INSPECTION

BACKGROUND OF THE INVENTION

The present invention relates to a method of locally cleaning surfaces of parts in the primary circuit of a nuclear reactor, i.e., in connection with inspection of the surfaces, which surfaces are coated with corrosion products, primarily oxides.

The primary circuit in a boiling water reactor is the circuit in which steam generated in the reactor vessel is passed to a steam turbine, from there to a condenser, and in which water formed in the condenser is returned to the reactor vessel. The primary circuit in a pressurized water reactor is the circuit in which water heated in the reactor vessel is passed to a steam generator and from there is returned to the reactor vessel. In case of recurring inspection of nuclear reactors, which is normally carried out when the reactors are shut down for refuelling, surfaces of the reactor vessel and of other parts including in the primary circuit are examined in order to determine, among other things, whether any cracks have formed in the construction material. The examination is often carried out with the aid of a TV camera while the examined surface is situated below the surface of the reactor water in the reactor vessel or in the reactor pool. Those metal surfaces, which are in contact with the reactor water during operation of the reactor, and particularly those surfaces which are in contact with high temperature water, are coated with a film of corrosion products, mostly oxides. Scrape marks and certain optical effects in the film are readily perceived as cracks in the construction material. The evaluation of an optical inspection can therefore be made more reliable if it can be performed on a metallically clean surface. Mechanical cleaning methods, such as grinding, blasting or brushing to remove the oxide, leave such tracks in the metallic surface as to render an optical inspection unreliable.

SUMMARY OF THE INVENTION

It is an object of the present invention to provide a method for locally cleaning metallic surfaces of parts in the primary circuit of a nuclear reactor so that the surfaces will be adapted for optical inspection. More specifically, the present invention relates to a method for local cleaning of metallic surfaces of parts included in the primary circuit of a nuclear reactor in connection with inspection of the surfaces, which surfaces are coated with corrosion products, above all oxides. The invention is characterized in that the coated metallic surface, while being situated below the surface of the reactor water in the reactor vessel or reactor pool of the nuclear reactor, is arranged to make contact with an electrolyte-permeable spacer of an electrically-insulating material, which, at a distance from the coated metallic surface, is arranged in contact with a body of an electrically-conducting material, and further in that electrolyte is supplied to the spacer and an electrical potential difference is maintained between the coated metallic surface and the body of the conducting material by connecting the coated metallic surface to the positive pole of a voltage source and the body of conducting material to the negative pole of the voltage source.

The body of electrically-conducting material is suitably shaped as a plate, which is arranged to make contact with the spacer on that side of the spacer facing away from the coated metallic surface. Further, it is suitably arranged to be permeable to the electrolyte, whereby the electrolyte can be supplied to the spacer via the body.

The cleaning can be rendered significantly more effective by subjecting the spacer to a movement relatively to the coated surface, such as a reciprocating movement along the surface.

For the method according to the present invention, all electrolytes can be used which are allowable in small amounts in the reactor water. The quantity of electrolyte which, during the cleaning, emerges into the reactor water in the reactor vessel or the reactor pool, is diluted very heavily and during the operation of the reactor it will be taken care of by ion exchange resin in the cleaning system. The supply of electrolyte to the spacer during the cleaning is suitably limited to such an amount that the reactor water fulfills the water-chemical specifications for shutdown of the reactor, and preferably to such an amount that the water-chemical specifications for the operation of the reactor are fulfilled. As examples of electrolytes that may be used may be mentioned solutions of salts in the form of sulphates, nitrates and phosphates of alkali metals such as sodium and potassium and further corresponding ammonium salts.

The spacer consists of a material, which is softer than the metallic material in the part which is to be cleaned for inspection. It may suitably consist of a fibrous material, a material with open porosity or of a material with perforations. It may, among other things, consist of cotton or of a polymer, such as polytetrafluoro ethylene or ethylene-propylene-diene rubber, for example in the form of a felt, a cloth or a brush.

To reduce the leakage of electrolyte from the spacer to the reactor water, surfaces of the spacer facing the reactor water may be surrounded by a sealing casing of insulating material, for example of any of the above-exemplified materials in the spacer.

The method according to the invention is particularly well adpated for use for inspection of surfaces in the reactor vessel and surfaces in the internal parts of the reactor vessel, such as steam separators, moderator tank cover, and core grids.

DESCRIPTION OF THE DRAWINGS

The invention will be explained in greater detail by means of example with reference to the accompanying drawings, wherein.

DETAILED DESCRIPTION OF THE PREFERRED EMBODIMENT

Figure 1:
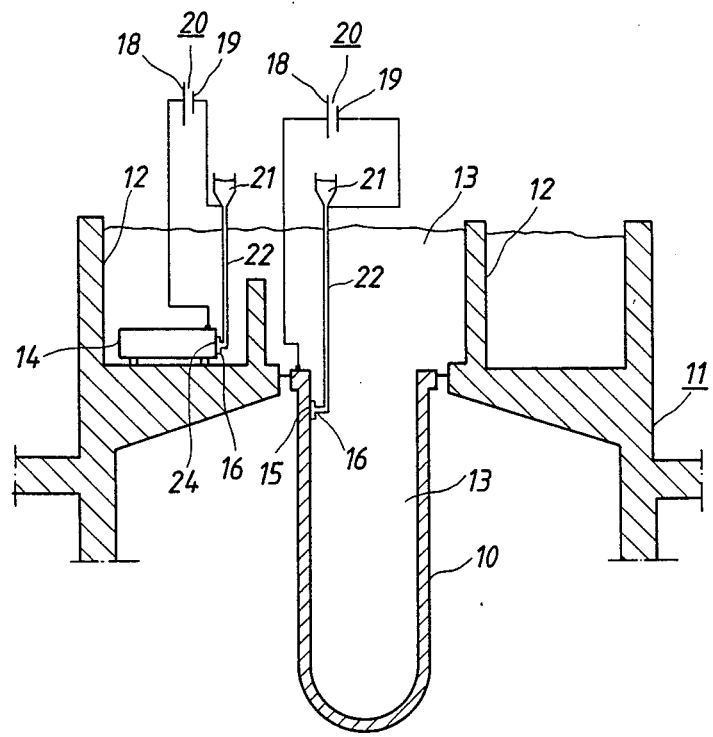
FIG. 1 shows a shutdown boiling water reactor with an internal part located in the reactor pool during local cleaning of surfaces on the reactor vessels and on the internal part according to the present invention.
Figure 2:
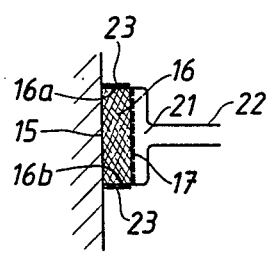
FIG. 2 shows on an enlarged scale part of a device shown in FIG. 1 for carrying out the cleaning.

FIG. 1 shows a shutdown boiling water reactor with a reactor vessel 10, from which the cover has been removed, and with part of the containment 11. The reactor pool of the reactor is designated 12. The reactor vessel and the reactor pool are filled with reactor water 13. In the exemplified case, the conductivity of the reactor water is lower than 0.2 microsiemens per cm at a temperature of 25° C. In the reactor pool there is located an internal part 14, for example a steam separator. During local cleaning according to the present invention of a surface 15 in the reactor vessel, which is to be inspected, an electrolytically permeable spacer 16, in the exemplified case in the form of a cushion consisting of cotton fibres enclosed in a casing of cotton cloth, is arranged in contact with the surface. On that side of the spacer facing away from the surface 15, there is arranged a perforated and thus electrolytically permeable plate of stainless steel 17. The surface 15 is connected to the positive pole 18 and the plate 17 is connected to the negative pole 19 of a voltage source 20. The spacer is supplied with an electrolyte 21 in the form of a 1 percent aqueous solution of $Na_2SO_4$ via a tube 22 of stainless steel, which is arranged in contact with the plate 17. The electrolyte is in contact with both the surface 15 and the plate 17. Surfaces 16a and 16b of the spacer facing the reactor water are surrounded by a sealing casing 23 of insulating material to reduce leakage of electrolyte from the spacer to the reactor water. The casing may, for example, consist of a film of polytetrafluoro ethylene, which is wound around the spacer. The spacer is brought to move relatively to the surface 15 with the aid of the tube 22 until an existing oxide layer (not shown) has been removed, whereafter the metallic surface thus exposed is inspected with a TV camera or in another optical manner. The necessary amount of electrolytic solution is sufficiently small for the water-chemical specifications of the reactor water to remain fulfilled. Cleaning of a surface 24 on the internal part 14 can be carried out in an analogous manner.

We claim:

1. A method of locally cleaning off corrosion products on a metallic surface located below the surface of reactor water in the primary circuit of a nuclear reactor, said corrosion products being primarily oxides, said method comprising the steps of
   (1) positioning an electrolyte-permeable electrically insulating spacer element below the surface of the reactor water and against said metallic surface to be cleaned,
   (2) positioning an electrically-conductive element in contact with said spacer element,
   (3) connecting said metallic surface to be cleaned to the positive pole of a voltage source,
   (4) connecting said electrically-conductive element to the negative pole of said voltage source,
   (5) supplying an electrolyte to said spacer element, and
   (6) allowing some of said electrolyte to leak into said reactor water.

2. A method according to claim 1, including the step of moving said spacer element relative to the metallic surface to be cleaned.

3. A method according to claim 1, wherein said spacer element has a front surface in contact with the metallic surface to be cleaned and a rear surface, wherein said electrically-conductive element is a perforated plate in contact with the rear surface of said spacer element and wherein said electrolyte is supplied to said spacer element through said perforated plate.

4. A method according to claim 1, wherein said electrolyte supplied to said spacer element in step (5) consists of sodium sulphate.

5. A method according to claim 1, wherein in step (5) the amount of said electrolyte supplied to said spacer element is controlled such that the water-chemical specifications of the reactor water for shutdown are fulfilled.

6. A method according to claim 1, wherein said spacer element is composed of a fibrous material.

7. A method according to claim 1, wherein said spacer element is composed of a material having an open porosity.

8. A method according to claim 1, wherein said spacer element is made of a material which is softer than that of the metallic material whose surface is to be cleaned and which has perforations.

9. A method according to claim 1, wherein said spacer element is made of a polymer material.

10. A method according to claim 1, wherein said spacer element has a side surface, and including the step of positioning a sealing casing of an insulating material around said side surface of said spacer element.

* * * * *